United States Patent [19]

Strauss

[11] 3,964,077
[45] June 15, 1976

[54] FLASH SYNCHRONIZING MECHANISM FOR CAMERAS

[75] Inventor: Karl-Peter Strauss, Volkmarode, Germany

[73] Assignee: Rollei-Werke Franke & Heidecke, Braunschweig, Germany

[22] Filed: Oct. 2, 1974

[21] Appl. No.: 511,192

[30] Foreign Application Priority Data
Oct. 5, 1973 Germany............................ 2350048

[52] U.S. Cl................................. 354/141; 354/32; 354/34
[51] Int. Cl.².......................................... G03B 15/03
[58] Field of Search ............. 354/141, 129, 137, 32, 354/33, 34, 139, 149

[56] References Cited
UNITED STATES PATENTS

| | | |
|---|---|---|
| 3,424,071 | 1/1969 | Schwahn......................... 354/141 X |
| 3,559,548 | 2/1971 | Ackerman .......................... 354/141 |
| 3,559,549 | 2/1971 | Ackerman ...................... 354/141 X |
| 3,667,357 | 6/1972 | Matsuda ............................... 354/33 |
| 3,712,197 | 1/1973 | Wagner.......................... 354/141 X |
| 3,750,550 | 8/1973 | Kasemeier ............................ 354/33 |
| 3,756,132 | 9/1973 | Ogawa................................. 354/32 |

FOREIGN PATENTS OR APPLICATIONS 1,086,554   8/1960   Germany ....................... 354/129

Primary Examiner—Robert P. Greiner
Attorney, Agent, or Firm—Stonebraker, Shepard & Stephens

[57] ABSTRACT

Mechanism for synchronizing the illumination produced by flash units of two different types, with the operation of a camera shutter, especially a shutter of the type having one blade mechanism for opening the shutter to start the exposure, and a separate blade mechanism for closing the shutter to terminate the exposure. The synchronizing mechanism has electronic circuitry which produces, at a single bi-polar contact, a first voltage variation at the beginning of the shutter opening movement and a second voltage variation at a later time, not later than the beginning of the shutter closing movement. A first form of adapter, used with a combustible flash bulb of the current-operated type, is plugged into the synchronous contact of the camera, and this adapter fires the flash bulb in response to the first voltage variation, far enough in advance of the termination of the exposure to allow time for the combustible flash bulb to achieve sufficient illumination intensity while the exposure is still in progress. A second form of adapter is plugged into the synchronous contact of the camera when an electronic flash unit is used, and responds to the second voltage variation, to cause firing of the electronic flash unit at a time when the shutter is open.

15 Claims, 7 Drawing Figures

FLASH SYNCHRONIZING MECHANISM FOR CAMERAS

CROSS REFERENCE TO RELATED APPLICATION

The mechanism here disclosed is intended for use particularly but not exclusively with a camera shutter of the type disclosed in the co-pending application of Heinz Wasske, Ser. No. 466,817, filed May 3, 1974, (now U.S. Pat. No. 3,922,697, granted Nov. 25, 1975) and owned by the owner of the present application. The entire disclosure of the prior application is incorporated herein by reference. Familiarity with the prior application will enable a better understanding of the relationship of the present synchronizing mechanism to the shutter mechanism, since the shutter mechanism is not disclosed in detail in the present application.

BACKGROUND OF THE INVENTION

As well understood in the art, flash illumination apparatus as used with photographic cameras is of two general types. One is an electronic flash device, which has come into widespread use in recent years. The electronic flash has no time lag in starting. It reaches peak illumination instantly when the necessary firing potential is applied, and the flash usually lasts about 0.5 milliseconds after ignition has occurred. The other general type of flash apparatus, much older than the electronic flash but still widely used, is the flash apparatus employing a current-ignited combustion flash light lamp or bulb. The combustion type of flash apparatus has an appreciable time lag of several milliseconds between the time that the firing current is applied to the bulb and the time that peak illumination is reached. The combustion flash has an average duration of about 37 milliseconds, but only part of this is at the peak illumination intensity.

It is very desirable that a camera be usable with both types of flash apparatus, since some potential users of the camera may have flash apparatus of one type, and some may have flash apparatus of the other type. Many cameras are known in the art, which provide so-called "fall" synchronization, so as to be usable with both types of flash apparatus. Most if not all of these cameras of the prior art have two separate synchronized contacts (plug receptacles) usually known in the art as the X contact or receptacle, and the M contact or receptacle. When the camera is being used with an electronic flash unit, the unit is plugged into the X contact, and the mechanism in the camera gives an impulse to this contact at a time when the shutter is completely open. When flash apparatus of the current-ignited combustion lamp type is used, this is plugged into the M contact of the camera, and the camera gives an impulse to this contact at which may be called a pre-ignition time, sufficiently far in advance of full opening of the shutter to allow for the time lag of a few milliseconds between the firing of the combustion flash lamp and the achieving of peak illumination.

The arrangement of two separate ignition devices for the respective flash types is undesirable because it requires a greater complexity and elaborateness, entailing higher cost, and especially because of the unfavorable effect on the aim of keeping the camera as small as possible. With growing trend toward very small cameras, it is simply not possible, as a practical matter, to accommodate two separate ignition devices, so that the camera designer must confine himself to synchronizing mechanism capable of firing only one of the two above mentioned types of flash apparatus.

It has been suggested that a camera equipped with only an X contact could be used to fire a combustion flash lamp, but because of the time lag inherent in a combustion flash bulb, this can be done only with a relatively long exposure. It is usually not possible to use a shutter speed faster than about 1/30th of a second, if a combustion flash bulb is to be ignited from an X contact. However, an exposure time of this length is often too long to avoid movement blurs, and also it is not practical when the flash is to be used for "fill-in" or shadow-softening purposes, with adequate illumination.

The object of the present invention is to provide full synchronization mechanism capable of use at will, either with a flash bulb or lamp of the current-ignited combustible type, or with an electronic flash unit, full synchronization being achieved with only a single synchronizing device or mechanism, and having only a single synchronous contact (receptacle for receiving a connection plug), and without necessitating any special switching arrangement to switch over from one type of synchronization to the other.

According to the present invention, this object is achieved by providing synchronizing mechanism which applies to the single synchronous contact a first voltage variation which provides the ignition impulse for a combustion lamp, and subsequently applies to the synchronous contact a second voltage variation which provides the ignition impulse for an electronic flash unit. When a combustible flash bulb and its appropriate adapter are plugged into the synchronous contact, the first voltage variation will fire the combustible bulb at a pre-ignition time which makes allowance for the above mentioned illumination lag. When an electronic flash device and its appropriate adapter are plugged into the synchronous contact, the arrangement is such that the first voltage variation will not cause firing of the electronic flash, but the second voltage variation, occuring at a time when the shutter is fully open, will fire the electronic flash.

In a further development of the invention, the synchronizing mechanism of the kind just mentioned is especially designed for use with an electronically controlled diaphragm shutter, in which the opening blade mechanism serves the function of a diaphragm as well as a shutter, and in which a separate blade mechanism closes the exposure aperture or light passage to terminate the exposure. One example of such a shutter is disclosed in the above mentioned Waaske patent application, Ser. No. 466,817. One aspect of the present invention includes automatic flash limitation means.

According to another aspect of the invention, the synchronizing mechanism is so designed that it may be used either for what may be called pure flash photographs (when there is not sufficient illumination for taking the photograph except with the use of flash) and for fill-in or shadow-softening photographs (when there is adequate illumination for taking the picture, but supplemental flash is desired to fill in the deep shadows). In the preferred embodiment of the invention, the synchronizing mechanism includes electronic controls responsive to light reflected from the subject being photographed, and effective to control the exposure both when pure flash and when fill-in flash is used.

DESCRIPTION OF THE PREFERRED EMBODIMENTS

Figure 1:
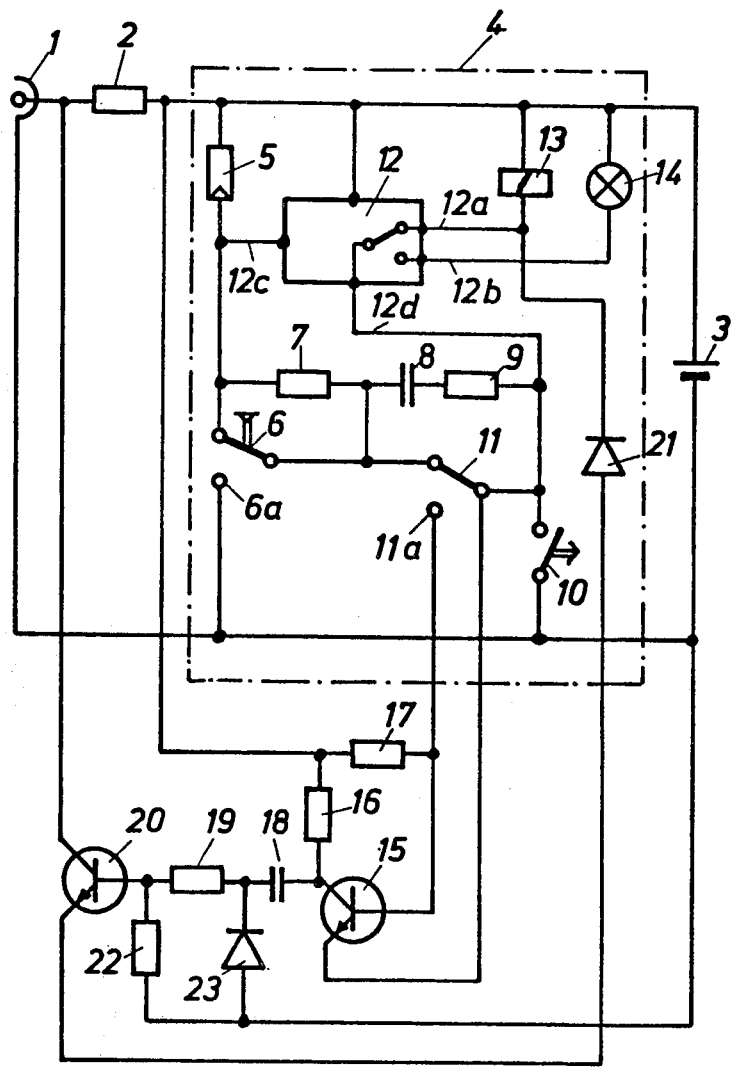
FIG. 1 is a circuit diagram of synchronizing mechanism according to a preferred embodiment of the present invention, capable of use either with current-operated combustion flash bulbs or with electronic flash units.

Referring first to FIG. 1, what may be called the synchronous contact or synchronizer contact or receptacle is shown schematically at 1, and is mounted in the usual way at any convenient place on the camera body (not shown). This contact is bi-polar, and conventionally comprises a central metallic contact member and a surrounding circular metallic sleeve insulated from the central contact member, these two parts being formed conventionally to constitute a receptacle for receiving and making electrical connection with a bi-polar plug which is electricaly connected to 9 flash device or unit, or to an adapter which, in turn, is electrically connected to the flash device or unit. In the drawings, the central contact member is shown separately, and the semi-circle partly surrounding it indicates schematically the conventional sleeve surrounding the central member. For the sake of brevity and convenience, the entire assembly of central member and surrounding member insulated from the central member is usually referred to herein as the synchronous contact or synchronizer contact, even though it is actually composed of two separate electrical contact members insulated from each other and even though it is usually in the form of a receptacle to receive a bi-polar plug.

As seen in FIG. 1, the inner or central member of the synchronous contact is connected through a resistor 2, which may be called a compensating resistor, to the plus or positive side of a suitable source of current such as a battery 3. The other or outside member of the synchronous contact 1 is connected, as shown, to the minus or zero potential side of the battery 3. The battery 3 serves for supplying current to the electronic control device of the shutter of the camera with which this arrangement is used. The electronic control device is indicated schematically, as a whole, by the dot-dash rectangle 4, and includes the parts shown within this rectangle in the wiring diagram. The shutter itself is preferably but not necessarily of the type known as a diaphragm shutter, meaning that the shutter opens to a variable extent depending upon the desired aperture at which the exposure is to be made, so that no separate diaphragm or "stop" is needed, and also of the type in which one blade mechanism is used for opening the shutter to initiate the exposure, and a separate blade mechanism is used for closing the shutter to terminate the exposure.

A suitable shutter for this purpose, incorporating both of the features above mentioned (that is, the diaphragm shutter feature, and the feature of an opening blade mechanism separate from the closing blade mechanism) is the shutter disclosed in the above mentioned application of Heinz Waaske, Ser. No. 466,817. Although this is the preferred shutter with which the present invention may be used, it is emphasized that it is not the only possible shutter for use with the present invention. So far as the present invention is concerned, the details of the shutter are not important and are subject to wide variation, so long as the opening movement of the shutter will serve to shift the switch 11 (referred to below) and so long as the closing movement of the shutter is prevented while the electromagnet 13 remains energized and the closing movement will start when current ceases to flow through the coil of the electromagnet 13 (further referred to below).

The electronic control device 4 includes a photoelectric transducer 5 connected in parallel with the battery 3 through a resistor 7, an integration condenser 8, a further resistor 9, and the switch 10 which is connected to the camera release or trigger member, so that when the camera release is operated to initiate an exposure cycle, this switch 10 is closed. The resistor 7 is short-circuited by the "measuring key" switch 6, when the switch is in the position illustrated in FIG. 1. Depression of the measuring key shifts the switch member 6 to its alternate position, making engagement with the contact 6a which is directly connected to the zero potential side of the battery 3. The integration capacitor 8 and the resistor 9 are short circuited by what may be called the starting switch 11, when this switch is in the position illustrated. When the opening movement of the shutter begins, the starting switch member 11 is shifted to its alternate position, engaging the contact 11a, so that the short circuit around the elements 8 and 9 is broken or discontinued.

Connected to the outlet of the photoelectric transducer 5 there is a threshold value switch indicated schematically at 12, which is of conventional known construction, and therefore the details of this switch are not illustrated, and only a few parts thereof are shown, sufficient for an understanding of the present invention. It is sufficient for present purposes to say that this conventional threshold value switch 12 has an inlet connection 12a connected to the positive pole of the battery 3 through the coil of the electromagnet 13, and another inlet connection 12b connected to the same positive pole of the battery through an indicating device 14, such as a small signal light. Moreover, the potential applied to the threshold value switch 12 through the inlet 12c serves, when a threshold value is reached, to shift or reverse the connection between the outlet 12d and the inlets 12a and 12b. This outlet 12d connects with the zero potential side of the battery 3 through the release swich 10, when the latter is closed. The measuring key switch 6, when shifted to engage the contact 6a, also connects with the zero potential side of the battery.

The contact member 11a of the previously mentioned starting switch 11 (which is shifted when the shutter begins to open) is connected to the base of a transistor 15. The emitter of this transistor is connected to zero potential through the release switch 10 when the latter is closed at the time of initiating the exposure. Parallel to the collector-base path of the transistor 15 there is a voltage divider circuit 16, 17, the central tap of which is connected to the positive pole of the battery 3 as shown. The collector of the transistor 15 is connected, through a capacitor 18 and resistor 19, to the base of another transistor 20, whose collector is connected to the positive pole of the synchronous contact 1, and whose emitter is connected through a diode 21 to the inlet 12a of the threshold value switch 12. The base of the transistor 20 is connected to zero potential through a very large resistor 22, that is, a resistor having a very large resistance. The connection point between the capacitor 18 and the resistor 19 is also connected to zero potential through a diode 23 which is connected in the backward or reverse direction.

Figure 7:
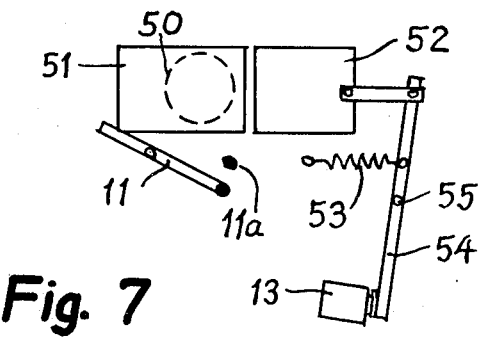
FIG. 7 is a schematic view of one form of shutter with which the circuit arrangement of FIG. 1 is used.

At this point it is desirable to refer to FIG. 7, which is a very schematic illustration of a shutter mechanism, simply to indicate how the operation of the shutter partly controls and partly is controlled by the electronic control device 4. In FIG. 7, the exposure aperture is indicated at 50, and the opening blade mechanism is indicated schematically by the rectangle 51, which initially overlaps and closes the exposure aperture 50, as shown. The opening blade mechanism may have a single blade, or preferably and usually more than one blade, such as the two blades in the opening blade mechanism of the shutter illustrated in the above mentioned application Ser. No. 466,817. The closing blade mechanism is indicated schematically in FIG. 7 by the rectangle 52. it also may have only a single blade, although ordinarily and preferably the closing blade mechanism comprises two or more blades, two such blades being present in the shutter illustrated in application Ser. No. 466,817.

When the opening blade mechanism 51 starts its opening movement (leftward movement in FIG. 7) the initial part of the opening movement shifts the switch 11 (FIG. 1 as well as FIG. 7) from the initial full line position shown in FIG. 1, to the alternate position where it engages the contact 11a. The spring 53 (FIG. 7) acting on a lever 54 fulcrumed at 55 tends to move the closing blade mechanism 52 to its closed position, but is prevented from doing so by the electromagnet 13 (FIG. 1 as well as FIG. 7) so long as the electromagnet 13 remains energized by flow of current through its coil. As soon as current ceases to flow through the coil of the electromagnet 13, the spring 53 moves the closing blade mechanism 52 rapidly to closed position, to terminate the exposure.

Figure 2:
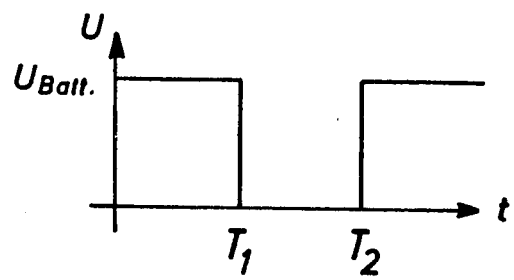
FIG. 2 is a time diagram illustrating the time relationship of voltage changes applied to the synchronous contact by the circuit arrangement shown in FIG. 1.
Figure 6:
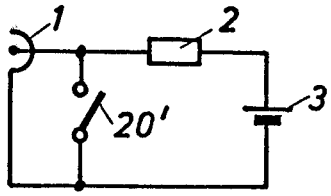
FIG. 6 is a basic schematic view illustrating the mode of operation of the circuit arrangement shown in FIG. 1.

With the understanding of the relationship of the shutter movements to the control mechanism illustrated in FIG. 1, the operation of the circuit arrangement of FIG. 1 can now be explained in conjunction with the basic explanatory diagram of FIG. 6 and the time-voltage diagram of FIG. 2. in the explanatory diagram of FIG. 6, the switch 20' is intended to represent the function of the transistor 20 in FIG. 1. This is, when the switch 20' in FIG. 6 is open, this represents the conditions when the transistor 20 is blocked or non-conductive so far as the collector-emitter path is concerned. When the switch 20' is closed, this represents the condition when the transistor 20 is conductive through the collector-emitter path.

With the camera ready to take a photograph, the full battery voltage $U_{Batt}$ is being applied to the synchronous contact 1. This is the voltage situation represented at the left edge of FIG. 2. When the switch 20' (FIG. 6) is now closed, this brings about a short-circuiting of the synchronous contact, at the instant $T_1$ of FIG. 2, so that the voltage applied to the synchronous terminal 1 drops to zero as indicated in FIG. 2. At a later instant $T_2$, the switch 20' is opened again, so that the full battery voltage $U_{Batt}$ is again applied to the synchronous contact 1.

It is these voltage variations indicated diagrammatically in FIG. 2 and applied to the synchronous contact 1 at the times $T_1$ and $T_2$ which operate respectively a combustion flash bulb or an electronic flash device. The manner in which these voltage variations are achieved in the circuit arrangement illustrated in FIG. 1 will be described below, but first it is desired to explain the adapters whch are to be used when a combustible flash bulb or an electronic flash device are to be connected to the camera.

Figure 3:
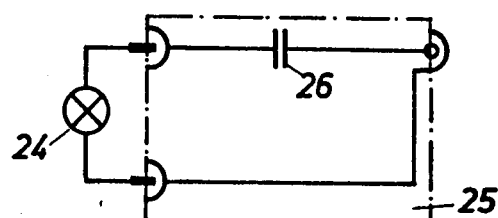
FIG. 3 is a circuit diagram of an adapter to be attached to the camera when using a combustion flash lamp.

If a combustible flash bulb or lamp is to be used, a simple adapter of the form shown in FIG. 3 may be employed. The combustible lamp, indicated at 24 in FIG. 3, is plugged into the adapter indicated in general by the dot-dash rectangle 25, and the adapter is plugged into the synchronous contact 1 of the camera. The adapter contains a capacitor 26 in the circuit leading from the positive terminal of the synchronous contact to one terminal of the lamp 24. While the camera is in readiness for taking a picture, the battery voltage is being applied to the synchronous contact 1, as already explained, and the capacitor 26 thus becomes charged, by current through the lamp 24, but this current is not sufficient to ignite the lamp. Then at the instant $T_1$, when the shutter release is pressed to start the exposure cycle, the switch 20' is closed (that is, the transistor 20 becomes conductive) thereby shortcircuiting the two poles of the synchronous contact 1. This causes the capacitor 26 to discharge through the combustible flash bulb 24, igniting the flash bulb, which will achieve its maximum brilliance of illumination a few milliseconds later, by which time the shutter will have opened approximately to its maximum opening.

Figure 4:
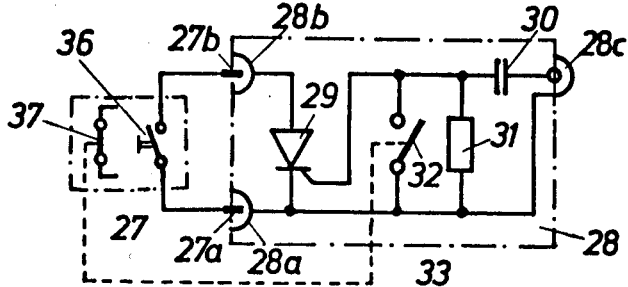
FIG. 4 is a circuit diagram of the second type of adapter, to be attached to the camera when using an electronic flash appliance.

If the camera is to be used with an electronic flash device rather than a combustible flash device, an adapter of the kind illustrated in FIG. 4 is used. The electronic flash device itself may be of conventional construction, and it is indicated in general by the broken line rectangle 27 in FIG. 4. The two poles 27a and 27b of the closing contact 36 of the ignition circuit of the electronic flash device 27 are plugged into or otherwise connected with the respective outlets 28a and 28b of the adapter of the present invention, which adapter is indicated in general by the dot-dash rectangle 28.

The adapter 28 contains a thyristor 29, whose cathode-anode path is connected to the outlets 28a and 28b. The cathode of the thyristor is also connected to the zero potential pole of the terminal for outlet 28c, which plugs into the synchronous contact 1 of the camera. The control grid of the thyristor is connected to a capacitor 30 to the central positive pole of the outlet 28c. A resistor 31 and a switch 32 are both arranged parallel to each other and parallel to the control grid-cathode path of the thyristor 29. This switch 32 is coupled to the on and off switch 37 of the electronic flash unit 27, in such manner that when the switch 37 is turned off, the switch 32 in the adapter will be closed, and when the switch 37 is turned on to make the unit 27 ready for operation, the switch 32 in th adapter will be opened. The operative connection between these switches 32 and 37 is indicated in FIG. 4 by a broken line.

Assuming that the terminal 28c of the adapter 28 is plugged into the synchronous contact terminal 1 of the camera, and that the electronic flash device 27 is properly mounted on the adapter 28, it is seen that if the switch 20' of FIG. 6 is opened (that is, if the transistor 20 of FIG. 1 becomes non-conductive through its collector-emitter path) so that the battery potential is applied to the synchronous contact 1 at the time $T_2$ in FIG. 2, then the battery voltage generates, through differentiating diferentiating capacitor 30, a trigger impulse at the control grid of the thyristor 29, so that the thyristor becomes conductive through its anode-cathode path and this closes the starting circuit of the conventional electronic flash device 27, creating the desired flash.

In order to prevent an unintentional triggering of the thyristor and an unintentional flash when the adapter 28 is plugged into the synchronous outlet 1 of the camera, the on-off switch of the electronic flash device 27 should be kept in the off position (that is, open) while the adapter 28 is being plugged into the camera. Because of the connection above explained, the opening of the switch 37 in the flash device will close the switch 32 in the adapter, thereby shortcircuiting the control grid circuit of the thyristor 29, thus insuring that the anode-cathode circuit will not become conductive, even though the battery potential may be present at the contact 1 at the time the adapter is plugged in. After the plug-in is completed, the switch 37 of the flash unit may be moved to the on position, which will open the switch 32, and the electronic flash apparatus will now be ready for operation. When the synchronous contact 1 of the camera is short circuited at the time $T_1$ (FIG. 2) early in the next cycle of exposure of the camera, this will discharge the capacitor 30 in the flashing adapter 28 but no signal will be given to the control grid of the thyristor 29, so no flash of the electronic flash device will occur. But later, at the time $T_2$, when potential is again applied to the synchronous contact 1 of the camera, the necessary impulse will be given through the differentiating capacitor 30 to the control grid of the thyristor, and the electronic flash will occur.

The above explanations have provided information as to the general way in which the synchronizing mechanism of the present invention operates. When this general understanding as background, it will now be comparatively easy to understand more specific details of operation of the preferred embodiment, referring especially to FIG. 1.

With the camera ready for taking a photograph, the capacitor 18 is charged to the battery voltage. The base of the transistor 15 is positively biased through the resistor 17 so that, upon operating the camera release to close the switch 10, the transistor 15 becomes conductive and the capacitor 18 discharges through the collector-emitter path of this transistor 15, the now closed release switch 10, and the diode 23. The capacitor 18 is thus discharged to zero potential, so that the transistor 20 remains blocked (non-conductive) in a reliable manner.

The operation of the camera release which closed the switch 10 has also initiated the operation of the shutter mechanism, in a manner not here disclosed but which is well understood in the art, the details being unimportant so far as the present invention is concerned. As explained above and as seen schematically in FIG. 7, the beginning of the opening movement of the shutter swings the switch 11 from the full line position shown in FIG. 1 to its alternate position, engaging the contact terminal 11a, so that the short circuit of the capacitor 8 and resistor 9, previously existing through the switch 11 in its first position, is discontinued or made ineffective. With the discontinuance of this short circuit, the electronic exposure control device becomes operative, and commences the measurement of the light reflected from the subject being photographed, which occurs through the photoelectric transducer 5. At the same time, the shifting of the switch 11 from its first position to its alternate position engaged with the terminal 11a has the effect of connecting the base of the transistor 15 to the emitter thereof. This causes the transistor 15 to block or become non-conductive. Thereupon, the collector of the transistor 15 becomes positive, and accordingly an equalizing current flows through the capacitor 18 and resistor 19 into the base of the other transistor 20. Consequently, the transistor 20 becomes conductive, thereby short circuiting the two poles of the synchronous contact 1 through the collector-emitter path of the transistor 20. This is equivalent to closing the switch 20' of the explanatory diagram 6. If a combustion flash light bulb 24 and its adapter 25 are plugged into the synchronous contact 1 of the camera at this time, the short circuiting of the synchronous contact will result in firing the combustible lamp 21, in the manner above explained. However, if an electronic flash device 27 and its adapter 28 are plugged into the synchronous contact of the camera at this time, the short circuiting of the synchronous contact will simply discharge the capacitor 30 in the adapter 28, but will not cause any flash.

The electronic exposure control device 4 of the camera is meanwhile measuring the light reflected from the subject being photographed, by means of the transducer 5 and the integration capacitor 8 and resistor 9. During this time current is flowing through the closed switch 10, and the connections 12d and 12a, through the coil of the electromagnet 13, keeping this magnet energized so that the closing motion of the shutter cannot start. When the mesured quantity of light reflected from the subject reaches the necessary amount sufficient for a correct exposure, the inlet 12c of the threshold value switch 12 reaches the specific threshold potential, and the switch 12, in the conventional known manner, now disconnects the terminal 12d from the terminal 12a and connects it to the terminal 12b. This stops the flow of current through the coil of the electromagnet 13, thereby releasing the shutter closing mechanism so that the shutter closing operation now commences. At the same time, this shift of connections in the threshold value switch 12 also serves to interrupt the short circuit of the synchronizer contact 1, since this short circuit through the conductive transistor 20 was also through the diode 21 and the terminal 12a to the terminal 12d of the switch 12 and back through the closed switch 10 to the zero potential side of the battery. Because of the cancellation of the short circuit, the battery potential is applied once more, through the resistor 2, to the synchronous contact 1. If the electronic flash device 27 and its adapter 28 have previously been plugged into the synchronous contact 1, the rise in voltage at the synchronous contact (at the time $T_2$ of the diagram in FIG. 2) will have the effect explained above, giving the necessary signal to the control grid of the thyristor 29 and causing a flash to be produced by the electronic flash device 27. This occurs instantly with this type of electronic flash device, and the light from the flash reaches the subject in ample time, while the shutter is still open, even though the shutter closing process is initiated at the same time and the shutter closes quite fast.

Figure 5:
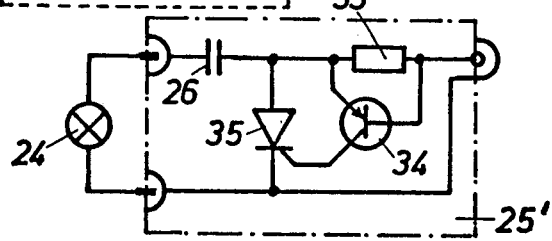
FIG. 5 is a circuit diagram of a modified type of adapter for combustion flash bulbs, which may be used in place of the one shown in FIG. 3.

The above described action of the threshold switch 12 in shifting the connection from the terminal 12a to the terminal 12b as a result of the measured reflected light occurs before the electronic flash is set off. Therefore those skilled in the art will recognize that we are here talking about a situation where there is sufficient light for taking the picture without relying upon the flash, and the flash is being used simply for fill-in or shadow-softening purposes. However, if the prevailing ambient light is not sufficient for correct exposure, then the integrating measuring circuit which includes the elements 5, 8, and 9 is not able to measure sufficient light to give a signal for the threshold switch 12 to switch over from the inlet terminal 12a to the inlet terminal 12b, so in this case the action is slightly different. While the threshold switch 12 remains in its first or initial position, with the inlet terminal 12a connected to the terminal 12d, the capacitor 18 is gradually charged through the resistor 16 and the resistor 19, and when this charge reaches a predetermined amount, it causes the transistor 20 to block or become non-conductive so far as the collector-emitter circuit is concerned. This interrupts or renders ineffective the short circuit of the synchronous contact 1, so that the battery potential builds up once more on the synchronous contact 1, and causes firing of the electronic flash. However, at the moment of flash the threshold switch 12 is still in its initial position with the terminal 12a still connected to the terminal 12d, so that current still continues to flow through the winding of the magnet 13, and the closing action of the shutter cannot start. The measuring circuit 5, 8, 9 continues to operate, measuring that portion of the light from the flash which is reflected from the subject, and when the integrated amount of this measured light reaches the value sufficient for the photographic exposure, the threshold switch operates as before, shifting the connection from the terminal 12a to the terminal 12b, so that current to the coil of the electromagnet 13 is cut off, and the shutter mechanism commences its closing movement. adapter An alternative or modified form of adapter for a combustible flash bulb may be used, if desired, to insure that the transistor 20 is not loaded in the short circuit by the charge on the capacitor 26 when the adapter 25 is connected to the synchronous contact 1, and to insure that the discharge time of the combustion lamp 25, which lasts longer, is not interrupted when the short circuit is cancelled by the transistor 20. This modified form of adapter is illustrated schematically in FIG. 5. The adapter in general is indicated at 25'. Like the first form of adapter illustrated in FIG. 3, this second embodiment of the a dapter contains, as before, a capacitor 26 arranged in the circuit between the combustible flash bulb 24 and the positive pole of the connector which is to be plugged into the synchronous contact of the camera. In addition, there is a resistor 33 in the circuit, between the capacitor 26 and the synchronous contact. This resistor 33 is bridged by the emitter-base path of a transistor 34, the collector of which transistor is connected as shown to the controlled grid of a thyristor 35 whose anode is connected to the junction between the capacitor 26 and the resistor 33, and whose cathode is connected to the zero potential side of the adapter inlet, which of course is connected to the zero potential side of the synchronous contact on the camera, when the adapter is plugged into the camera.

In operation, when the transistor 20 is conductive in its collector-emitter circuit, a voltage drop occurs at the resistor 33 in the adapter, as a result of the discharge of the capacitor 26. This voltage drop renders the transistor 34 conductive, so that through the collector-emitter path of the transistor 34, a potential which is higher than the potential of the cathode of the resistor 35 is applied to the control grid of the thyristor 35, as a result of which the thyristor becomes conductive and takes over the discharge current of the capacitor 26.

In order to avoid over-exposure of the photograph, it is very desirable that when an electronic flash device is used with the synchronizing mechanism of the present invention, the flash device be of the so-called computer type, well known in the art, which has its own light measuring circuit and serves to break-off or terminate the flash when enough light has been reflected from the subject, independently of the measuring circuit 5, 8, 9 and the threshold switch 12. In true flash photograph operations as distinguished from fill-in use of the flash with sufficient ambient light, the transistor 20 does not block until the charge on the capacitor 18 is reversed and consequently triggers the electronic flash. This charge reversal commences with the closing of the starting switch 11 against the contact 11a, at the commencement of the opening movement of the shutter. In order to make possible the use of the apparatus for additional flash illumination according to fill-in technique when taking daylight photographs in adequate ambient light, the charge of reserval time of the capacitor 18 is chosen to be at least so large that an exposure time can be achieved in which a photograph taken by hand is still possible. Due to the characteristics of a diaphragm shutter of the type preferably used with the present synchronizing apparatus, in which the opening of the shutter commences slowly in order to release, with an increasing exposure time, the opening of the diaphragm which grows into the maximum possible diaphragm opening, this time (the charge reversal time of the capacitor 18) is always made greater or longer than the time required by the shutter mechanism to achieve maximum opening of the diaphragm. This means that, when taking true flash photographs as distinguished from fill-in photographs, the electronic flash is always released (that is, caused to flash) at a time when the diaphragm is fully open, the latter representing, in other words, the unchangeable working diaphragm of the electronic flash device. According to the guide number of a flash device, an accurate exposure of the photograph is effected, with a particular diaphragm aperture of the camera, only at a specific distance of the object from the camera. A shortening or lessening of this distance from camera to object leads to overexposure. At a variable distance, the flash device therefore must comprise a device which will interrupt or terminate the flash emission when the exposure is sufficient. Such a device is present in the known electronic flash devices of the so-called computer type, widely available on the market, and such computer flash devices are the ones which should be used when using electronic flash with the synchronizing mechanism of the present invention.

What is claimed is:

1. Photographic flash synchronizing mechanism for cameras for selective operation either with a current-ignited combusion flash unit or with an electronic flash unit, comprising
   a. means forming a single bi-polar synchronous contact;
   b. means for applying to said synchronous contact, during one exposure cycle of a camera, a first voltage variation in predetermined timed relation to the commencement of said exposure cycle;
   c. means responsive to said first voltage variation for causing ignition of an associated current-ignited combustion flash unit, if such unit is attached;
   d. means for applying to said synchronous contact, during during the same exposure cycle of said camera, a second voltage variation at a determinable time interval after said first voltage variation; and
   e. means responsive to said second voltage variation for causing ignition of an associated electronic flash unit, if such unit is attached.

2. Mechanism as defined in claim 1, wherein said camera comprises shutter means capable of an opening movement and a closing movement, and wherein said means for applying said first voltage variation comprises means for short-circuiting said bi-polar synchronous contact, and wherein said means for applying said second voltage variation comprises means for discontinuing the short-circuiting of said contact.

3. Mechanism as defined in claim 1, further comprising an adapter electrically connected to said synchronous contact and also to a conventional flash unit, said adapter having means for converting one of said voltage variations into an impulse to ignite the connected flash unit.

4. Mechanism as defined in claim 3, wherein said adapter comprises a capacitor (26) connected in series with a combustion flash unit and charged through said synchronous contact.

5. Mechanism as defined in claim 3, wherein said adapter comprises a thyristor (29) having an anode-cathode circuit which, when conductive, completes a firing circuit of an attached electronic flash unit, and a capacitor (30), said thyristor having a control grid connected to said synchronous contact through said capacitor.

6. Mechanism as defined in claim 5, wherein said adapter further comprises a switch (32) disposed parallel to the control grid-cathode path of said thyristor (29), and wherein said electronic flash unit has an on-off switch (37), further comprising means coupling said switch (32) to said on-off switch (37).

7. Mechanism as defined in claim 1, wherein said camera includes a diaphragm shutter having opening blade means which open to a variable extent to serve as a diaphragm and closing blade means movable to close the shutter after a time determined by a control device in relation to opening movement of said opening blade means, said means for applying said first and second voltage variations comprising means for short-circuiting said synchronous contact when said opening blade means commence to open, and means for discontinuing the short-circuiting of said contact at the beginning of the closing movement of said closing blade means or after a time longer than the time required for said opening blade means to achieve maximum diaphragm opening, whichever first occurs.

8. Mechanism as defined in claim 7, wherein said control device comprises an electronic control circuit (4), further comprising a current source (3) feeding said control circuit (4) and connected to said synchronous contact (1) through a resistor (2).

9. Mechanism as defined in claim 8, further comprising a transistor (20) having a collector-emitter path connected in parallel to said synchronous contact (1).

10. Mechanism as defined in claim 9, further comprising an electromagnet (13) serving, while energized, to prevent closing movement of said closing blade maens, de-energization of said electromagnet serving to release said closing blade means for closing movement, and switching means having one position (12a) supplying current to said electromagnet, said switching means when moved from said one position (12a) serving to discontinue supply of current to said electromagnet to de-energize said electromagnet, said transistor (20) having an emitter connected to zero potential through said switching means when said switching means is in its said one position (12a)

11. Mechanism as defined in claim 10, wherein the base of said transistor (20) is connected to a positive pole of said synchronous contact (1) through an RC network (16, 18, 19) which includes a capacitor (18), further comprising a camera release actuable to initiate an exposure cycle, means effective upon actuation of said release for applying zero potential to said network capacitor (18), and means effective upon commencement of opening movement of said opening blade means for separating said capacitor (18) from zero potential.

12. Mechanism as defined in claim 11, comprising a further transistor (15) having a collector-emitter path connected in parallel with said network capacitor (18), through a diode (23) and through a switch closed by actuation of the camera release, means for connecting the base of said further transistor (15) to the positive pole of said synchronous contact (1) through a resistor (17), and means (11) effective at the commencement of opening movement of said opening blade means for connecting the base of said further transistor (15) to the emitter thereof.

13. Mechanism as defined in claim 12, wherein said means (11) for connecting the base of said further transistor (15) to its emitter includes a switch (11) shifted at the commencement of said opening movement, and wherein the shifting of said switch serves also to render said electronic control circuit (4) operative.

14. Mechanism as defined in claim 10, wherein said first mentioned transistor (20) has its base additionally connected to zero potential through a resistor (22) having a relatively large resistance.

15. Mechanism as defined in claim 4, wherein said adapter further comprises a thyristor (35) having its anode connected through a resistor (33) to the positive pole of said synchronous contact (1), the cathode of said thyristor being connected to the zero potential pole of said synchronous contact (1), and a transistor (34) having an emitter-base path in parallel with said resistor (33), the control grid of said thyristor being connected to its anode through the collector-emitter path of said transistor (34).

* * * * *